United States Patent [19]
Biswas et al.

[11] Patent Number: 6,012,139
[45] Date of Patent: Jan. 4, 2000

[54] MICROPROCESSOR INCLUDING FLOATING POINT UNIT WITH 16-BIT FIXED LENGTH INSTRUCTION SET

[75] Inventors: Prasenjit Biswas, Saratoga; Shumpei Kawasaki, Palo Alto, both of Calif.; Norio Nakagawa, Tokyo, Japan; Osamu Nishii, Tokyo, Japan; Kunio Uchiyama, Tokyo, Japan

[73] Assignee: Hitachi Micro Systems, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/594,750

[22] Filed: Jan. 31, 1996

[51] Int. Cl.⁷ .................................................. G06F 9/302
[52] U.S. Cl. ........................................ 712/222; 712/203
[58] Field of Search .................................. 395/379, 563, 395/562, 200.05; 712/203, 222, 221; 709/220

[56] References Cited

U.S. PATENT DOCUMENTS

| | | | |
|---|---|---|---|
| 4,171,537 | 10/1979 | Weissberger et al. | 395/200.05 |
| 4,729,094 | 3/1988 | Zolnowsky et al. | 395/200.05 |
| 4,979,102 | 12/1990 | Tokuume | 395/200.05 |
| 5,029,073 | 7/1991 | Takaya et al. | 395/200.05 |
| 5,053,631 | 10/1991 | Perlman et al. | 364/748 |
| 5,129,065 | 7/1992 | Priem et al. | 395/379 |
| 5,193,159 | 3/1993 | Hashimoto et al. | 395/200.05 |
| 5,487,022 | 1/1996 | Simpson et al. | 364/715.04 |

OTHER PUBLICATIONS

"Implementing Precise Interrupts in Pipelined Processors," IEEE Transactions on Computers, vol. 37, No. 5, May 1988, pp. 562–573.
"SH3: High Code Density, Low Power," IEEE Micro, Dec. 1995, pp. 11–19.
"Hitachi Adds FP, DSP Units to SuperH Chips," Microprocesor Report, Dec. 4, 1995, pp. 10–11.
Intel, iAPX 86/88, 186/188 User's Manual, *Hardware Reference*, 1985, pp. 3–8.

*Primary Examiner*—Richard L. Ellis
*Attorney, Agent, or Firm*—Graham & James LLP

[57] ABSTRACT

A Floating Point Unit (FPU) with a sixteen-bit fixed length instruction set for thirty-two bit data. The FPU operates as part of RISC microprocessor. The CPU does all memory addressing. Furthermore, data between the CPU and the FPU is transferred via a communication register. An FPU pipeline is synchronized with a CPU pipeline. The sixteen-bit fixed length instruction group has special instructions for immediate loading of a floating point zero and/or a floating point one. Two instructions are dedicated for this purpose. Furthermore, the 16-bit fixed length instruction group of the FPU flushes denormalized numbers to zero. The instruction set also rounds floating point numbers to zero. An FMAC instruction of the instruction set has the capability to accumulate into a different register for consecutive FMAC operations.

20 Claims, 15 Drawing Sheets

Microfiche Appendix Included
(1 Microfiche, 63 Pages)

16-BIT FP INSTRUCTION

FPU AND CPU PIPELINES

32-BIT FLOATING POINT INSTRUCTION

16-BIT FP INSTRUCTION

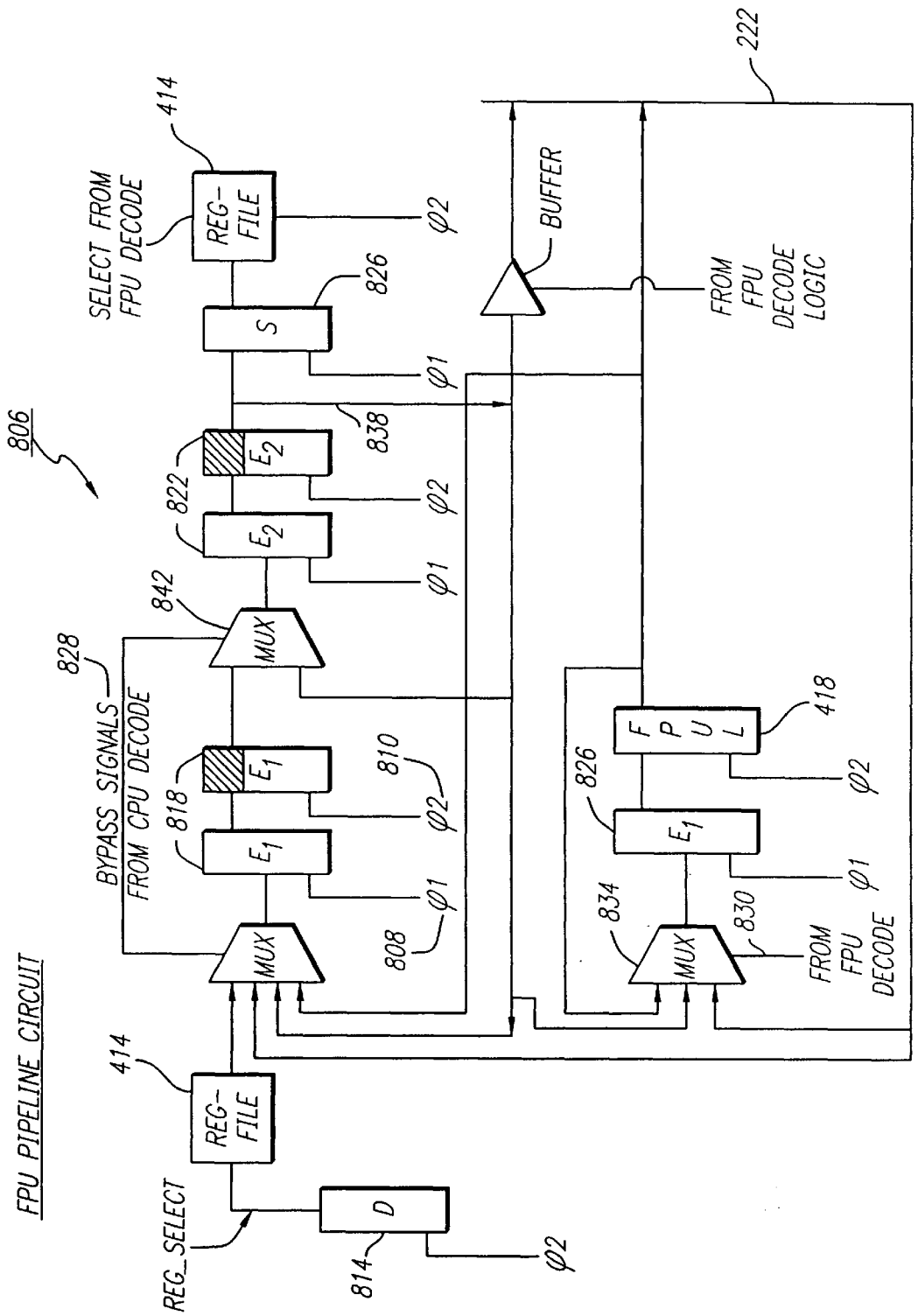

MICROPROCESSOR INCLUDING FLOATING POINT UNIT WITH 16-BIT FIXED LENGTH INSTRUCTION SET

CROSS REFERENCE TO MICROFICHE APPENDIX

This patent application incorporates one (1) microfiche containing sixty-three (63) frames of appendix entitled "APPENDIX A and referred to hereafter as "Appendix A."

BACKGROUND OF THE INVENTION

Some RISC (Reduced Instruction Set Computer) microprocessors have FPU's (Floating Point Unit). A floating point unit is a circuit for executing floating point computations. RISC is a computer architecture that uses relatively simple, fixed size instructions to reduce the complexity of the microprocessor. Usually, most instructions in a RISC architecture operate on operands available in general purpose registers and store results in a general purpose register. These registers are loaded from memory. Typically register contents are reused during execution of a program. Most RISC architectures have sixteen or more general purpose registers. Floating point instructions in typical RISC architectures have a length of at least thirty-two bits. An example of such a RISC microprocessor is a Power PC. Power PC's were introduced by IBM and Motorola. Similarly, MIPS, another RISC-based microprocessor, also requires thirty-two bits for each floating point instruction. MIPS microprocessors are made by MIPS Computer Systems, Inc., of Sunnyvale, Calif.

FIG. 1 illustrates a typical 32-bit length floating point instruction 110 for the Power PC. Seventeen bits of instruction 110 are dedicated to the operation code 114. Fifteen bits 118 of the floating point instruction 110 are used to address registers. The operation code 114 of the floating point instruction 110 operates on the contents of registers addressed using the fifteen bits 118 to perform the floating point instruction 110.

One reason that RISC architectures typically require at least thirty-two bit long floating point instructions is because such instructions typically use three operands with registers selected from a bank of thirty-two floating point registers. To address thirty-two registers requires five bits. So, selecting each operand from thirty-two bit registers already requires fifteen bits. Obviously, additional bits are required for the operation code 114.

There is a related issue of transfer of data between registers of the FPU and registers of a CPU (Central Processing Unit) of the RISC microprocessor. An example of a register is an array of latches. Typically, a floating point unit has registers for storing data in floating point format. Similarly, a CPU has integer registers for storing data in integer format. Transfers of data between integer and floating point registers usually occur via the memory unit, such as cache memory of the RISC microprocessor. For instance, when the FPU needs to transfer data to the CPU, the FPU first transfers data from a floating point register to the cache memory. Second, the CPU retrieves this data stored in the cache memory for storage in the CPU register. However, access to cache memory for data storage or retrieval is relatively slow compared to data access for storage or retrieval from a register. Moreover, the capability to access memory requires die area for the memory access circuits for the FPU and the CPU. But die area is at a premium in, for example, embedded applications. Embedded applications are those where, for instance, a processor is dedicated to a particular function, such as a game. Some more complex RISC processors dedicate a direct path for data transfer between the CPU and the FPU registers. However, this additional path requires an increase in die area.

SUMMARY OF THE INVENTION

This invention relates generally to a 32-bit RISC architecture with a 16-bit fixed length floating point instruction set. Reducing the floating point instruction length to only sixteen bits saves memory space for storage of a computer program. For example, reducing the floating point instruction length from thirty-two bits to sixteen bits cuts the memory required for storing these instructions by half. Reducing instruction size reduces the cache miss rate, because more instructions can be stored in the cache memory. Furthermore, reducing the floating point instruction length improves the instruction fetch latency. The 16-bit instructions are fetched in 32-bit blocks. Consequently, a single fetch from memory can obtain two instructions, whereas for 32-bit instructions it is possible to fetch only one instruction per memory access. Reducing the floating point instruction length permits reduction in the size of the memory required for storing the floating point instructions, thus reducing the die area used for on-chip cache memory.

For efficiency, this embodiment may not support all of the exceptions of the IEEE floating point standard No. 754. Also, all of the IEEE rounding modes are not necessarily supported. Similarly, if the result of a value generating floating point operation is a denormalized number, it is flushed to zero. All these above deviations from the IEEE floating point standard save die area and execution cycle time.

BRIEF DESCRIPTION OF THE DRAWINGS

FIG. 8 is a more detailed circuit diagram of the FPU pipeline, in accordance with a preferred embodiment of the invention.

DETAILED DESCRIPTION OF THE PREFERRED EMBODIMENTS

This patent application is related to the concurrently filed patent application Ser. No. 08/594,763 entitled "Floating Point Unit Pipeline Synchronized With Processor Pipeline" by the inventors Prasenjit Biswas, Gautam Dewan, Kevin Iadonato, Norio Nakagawa, and Kunio Uchiyama, which is incorporated by reference. This reference patent application has issued as U.S. Pat. No. 5,860,000.

A preferred embodiment of this invention is a 32-bit RISC architecture with a 16-bit fixed length floating point instruction set. Reducing the floating point instruction length to only sixteen bits saves memory space for storage of a computer program. For example, reducing the floating point instruction length from thirty-two bits to sixteen bits cuts the memory required for storing these instructions by half. Reducing instruction size reduces the cache miss rate, because more instructions can be stored in the cache memory. Furthermore, reducing the floating point instruction length improves the instruction fetch latency. Fetch latency refers to the time required to fetch an instruction from memory. The 16-bit instructions are fetched in 32-bit blocks. Consequently, a single fetch from memory can obtain two instructions, whereas for 32-bit instructions it is possible to fetch only one instruction per memory sequence. Reducing the floating point instruction length can also reduce the size of the memory required for storing the floating point instructions, thus reducing the die area used for on-chip cache memory.

This embodiment is particularly advantageous for embedded applications (e.g. video games) that have a need for efficient support for three dimensional graphics. Generally, data representation for single precision floating point conforms to the IEEE floating point standard. However, for efficiency, this embodiment does not support all exceptions of the IEEE floating point standard. Also, all of the IEEE rounding modes are not supported. Similarly, if the result of a value generating floating point operation is a denormalized number, it is flushed to zero. All these above deviations from the IEEE floating point standard save die area and execution cycle time. The precise details of the deviations from the IEEE floating point standard are shown in the Appendix A (see pages A27–A28.) The above, is discussed in additional detail further below.

Figure 1:
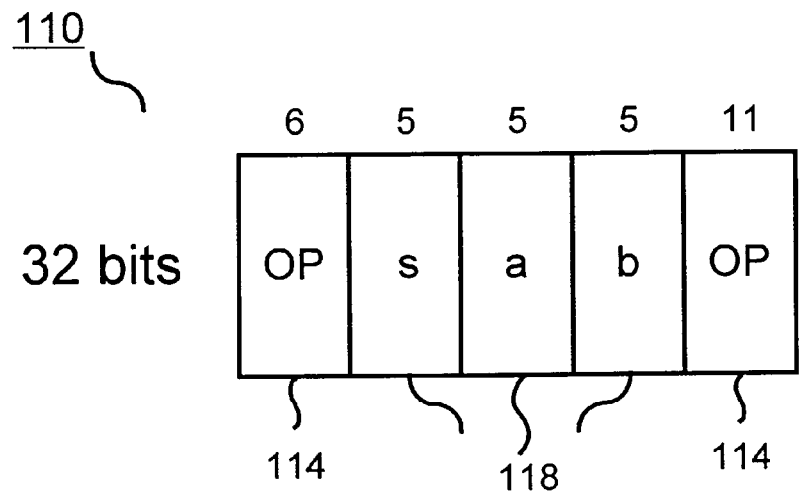
FIG. 1 illustrates a typical 32-bit length floating point instruction for the Power PC.
Figure 2:
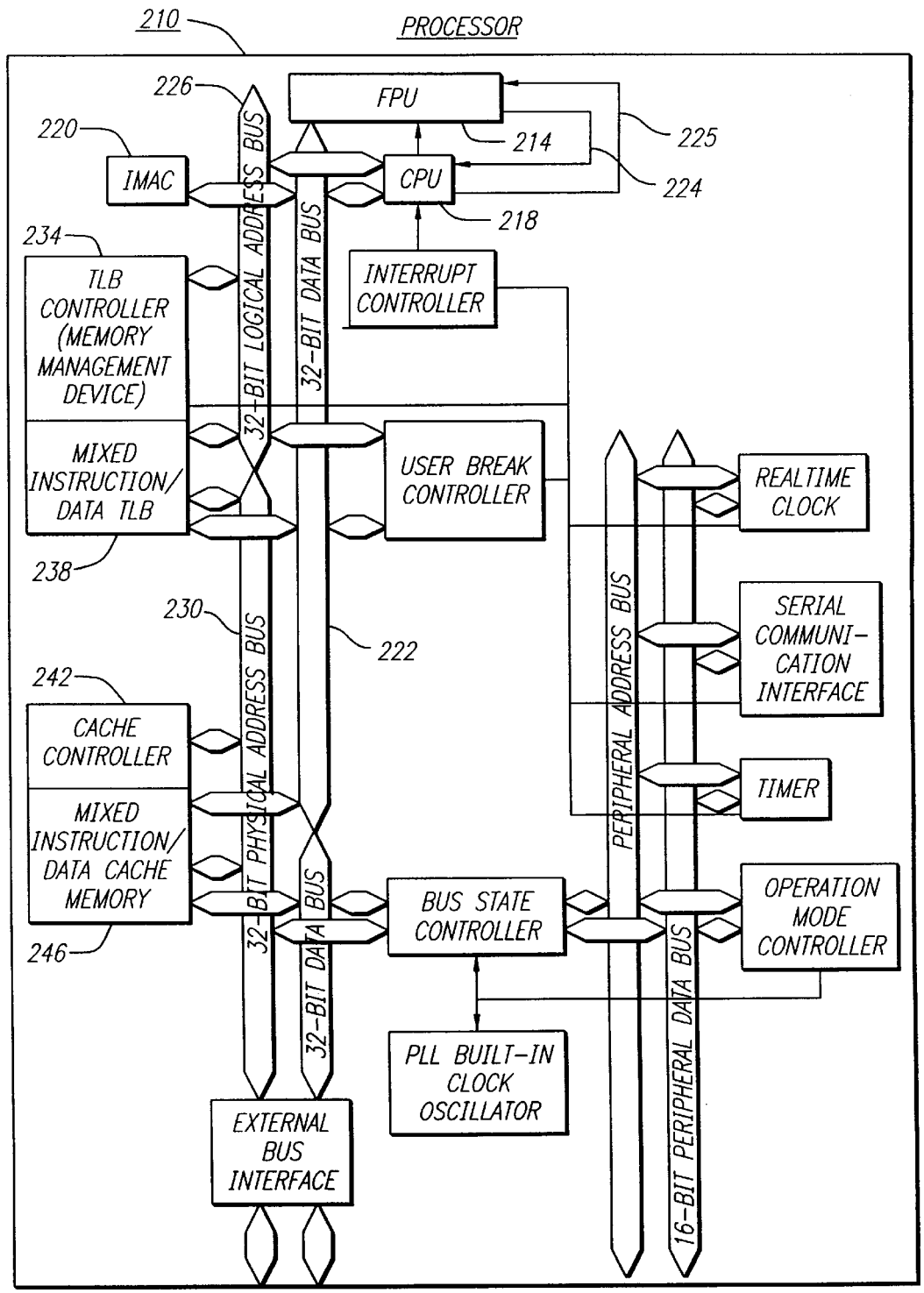
FIG. 2 is a diagram illustrating a circuit for a processor including a Floating Point Unit (FPU), in accordance with a preferred embodiment of the invention.

FIG. 2 shows a diagram for a processor of this embodiment of the present invention. Processor 210 has a Floating Point Unit (FPU) 214. In addition, the processor 210 has a Central Processing Unit (CPU) 218, which has the capability of operating on integers. Details and advantages of using fixed length 16-bit instructions for the CPU 218 have been discussed in the Article "SH3: High Code Density, Low Power," IEEE Micro, pp. 11–19, December 1995, which is hereby incorporated by reference. The CPU 218 is coupled to the FPU 214 via a 32-bit data bus 222. An Integer Multiplication and Accumulation Unit (IMAC) 220 is coupled to the data bus 222. Interface signals between the circuits of FIG. 2 are not shown except for the interface signals 224 and 225 between the CPU 218 and the FPU 214 (see Appendix A, pages A58 to A59). The CPU 218 is coupled via a 32-bit logical address bus 226 to a memory management device 234 (TLB controller). TLB stands for Translation Look Ahead Buffer. The TLB controller 234 controls a mixed instruction/data TLB 238. The TLB 238 is coupled via a 32-bit physical address bus 230 to a cache controller 242. The cache controller 242 controls a mixed instruction/data cache memory 246. The cache memory 246 is coupled via the 32-bit data bus 222 to the CPU 218 and the FPU 214. Based on this description and descriptive names in FIG. 2, the functions of additional circuits illustrated in FIG. 2 are self-explanatory to one of ordinary skill in the art.

The function of the processor 210 can be understood by the following example. The FFU 214 may require data or an instruction from memory for a floating point operation. In this embodiment, the FPU 214 does not have the capability of addressing memory to retrieve data from or store data in cache memory 246. This saves die area by obviating the need for FPU memory addressing circuitry. Instead, the CPU 218 addresses the cache memory in place of the FPU 214. Not only does the CPU 218 initiate fetching of data from memory for the FPU 214, the CPU 218 also fetches from memory all instructions including floating point instructions for the FPU 214. Furthermore, as explained in greater detail below, data transfers between the FPU 214 and the CPU 218 are conducted without memory access but instead through faster register access.

To obtain data or an instruction, the CPU 218 requests data or instructions from memory 246 by computing and sending a logical (i.e., virtual) address to the memory management device 234 via the 32-bit logical address bus 226. If the corresponding physical address is not already stored in the TLB 238, then a TLB miss occurs and the TLB controller 234 initiates a program sequence to convert (translate) the logical address into a physical address using additional mapping information. The memory management device 234 then stores the physical address in the TLB 238. The TLB 238 stores the address for future use, when the CPU 218 again may request data at the same address range. TLB 238 sends the physical address via the 32-bit physical address bus 230 to the cache controller 242. The cache controller 242 instructs the mixed instruction/data cache memory 246 to place the data or instruction on the 32-bit data bus 222. If the requested address is not available in the cache memory 246, a cache miss occurs and CPU 218 and FPU 214 processing is frozen by application of a cache miss signal (c2_sbrdy [see page A58 of the Appendix A] until the required information is fetched to the cache from external memory. An instruction is picked up for decoding by both the CPU 218 and the FPU 214. Instruction data is available on a common 32-bit data bus shared by the CPU 218 and the FPU 214. The FPU 214 preferably does not have the capability of initiating memory addressing for data and/or instruction fetch.

The floating point data that the CPU 218 fetches from cache memory 246 is stored in standard IEEE single precision format. However, in this design, as mentioned earlier, the IEEE floating point standard is not strictly adhered to. These deviations are to reduce the die area and to reduce the number of needed execution cycles of the processor 210. These deviations are acceptable compromises in embedded applications. For example, denormalized floating point numbers are flushed to zero (i.e., set to zero) by value-generating floating point operations. A denormalized floating point number has a biased exponent of zero value. Examples of value-generating floating point operations are floating point addition, subtraction, multiplication, and division. However, a non-value-generating floating point operation, such as a copy instruction, does not flush to zero a denormalized floating point number.

Figure 3:
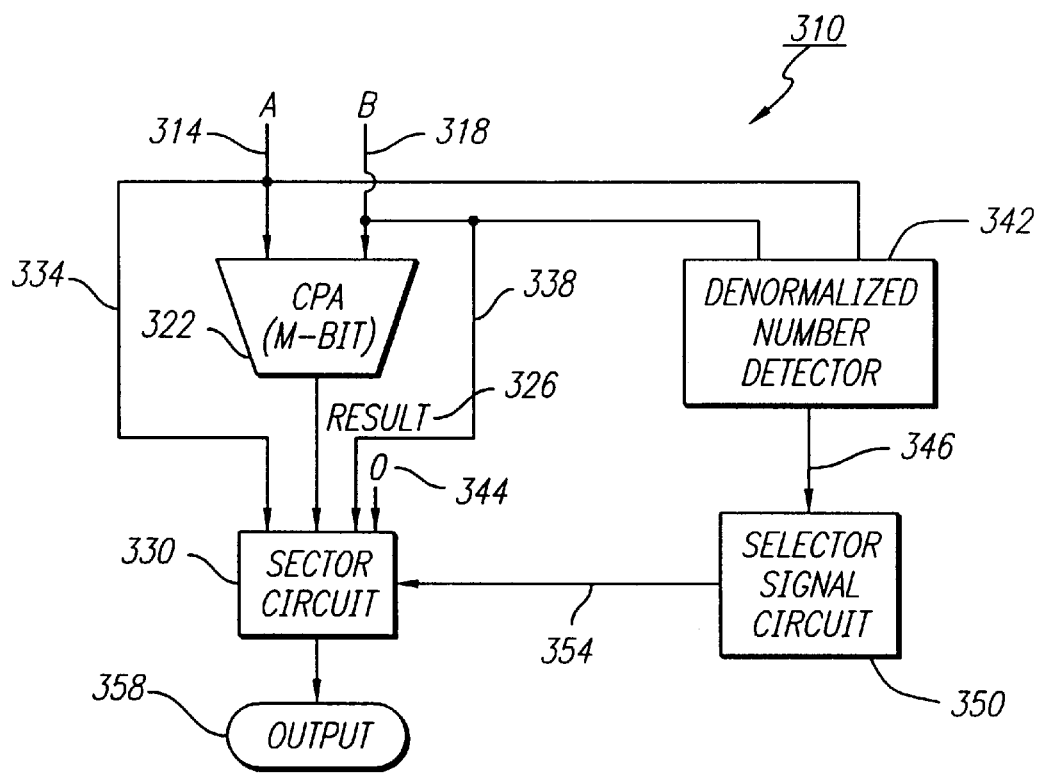
FIG. 3 is a diagram illustrating a circuit for flushing denormalized floating point numbers to zero, in accordance with a preferred embodiment of the invention.

A circuit 310 for flushing denormalized numbers to zero is shown in FIG. 3. The circuit 310 has floating point number inputs 314, 318 to a carry propagation adder (CPA) 322. The adder 322 can add the floating point numbers A and B to provide a result 326 to a selector circuit 330. Data paths 334 and 338 couple inputs 314, 318, respectively, directly to the selector 330. Inputs 314 and 318 also are connected to a denormalized number detector 342. Also connected to the selector circuit 330 is an input for a floating point number of value zero 344. Signal path 346 connects the denormalized number detector 342 with a selector signal circuit 350. Selector signal path 354 couples selector signal circuit 350 to the selector circuit 330. The selector 330 can provide an output 358.

The circuit 310 flushes denormalized numbers to zero as follows. The denormalized number detector 342 detects whether either one of floating point numbers A or B is a denormalized number. The denormalized number detector 342 passes this information via signal path 346 to the selector signal circuit 350. If either one of the floating point numbers A or B is a denormalized number, then the selector signal circuit 350 controls the selector circuit 330 via selector path 354 to select directly the non-denormalized number 314 or 318. If neither of the floating point numbers A, B is a denormalized number, then the selector signal circuit 350 controls the selector circuit 330 to select the result 326 for the output 358 of the selector circuit 330.

However, if both floating point numbers A and B are denormalized numbers, then the selector signal circuit 350 controls the selector circuit 330 to select the zero 344 for the output 358 of the selector circuit 330.

Based on this description, one of ordinary skill in the art will understand how to modify circuit 310 to handle denormalized floating point numbers A and/or B for other floating point operations. For instance, clearly, the adder 322 could also be used for a subtraction of floating point numbers A and B from each other. Similarly, in place of the adder 322, a multiplier could multiply floating point numbers A and B. However, in the case of a multiplication, the selector signal circuit 350 would control the selector circuit 330 to select the zero value 340, even if only one of the floating point numbers A or B were a denormalized number.

Also, one of ordinary skill in the art will realize, based on the above description, that if the adder 322 were replaced with a divider, then the selector signal circuit 350 would control the selector 330 to select either the zero value 344 or an infinity representation of a floating point number. The particular selection would depend on which of the floating point numbers A or B is a denormalized number. (See divide by zero exception on page A29 of the Appendix A.) The case of a divider replacing the adder 322 and both floating point numbers A and B being denormalized numbers is an example of an invalid operation (see page A28 of Appendix A).

As mentioned above, to further simplify hardware complexity of the FPU 214, floating point numbers are rounded to zero, i.e, truncated. Not only is hardware complexity reduced by rounding to zero, but in addition, clock cycles are saved.

Figure 14:
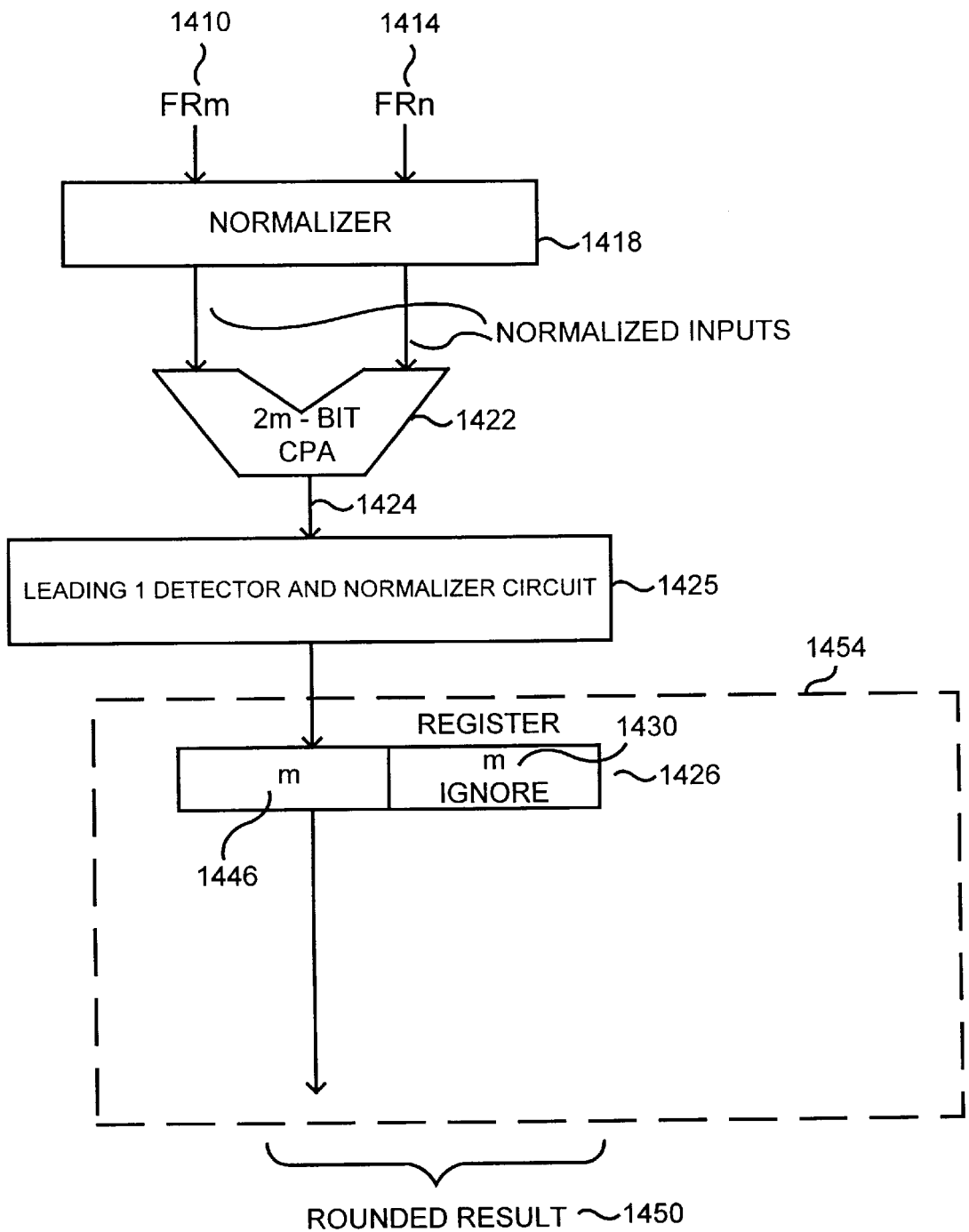
FIG. 14 is a diagram illustrating a circuit for rounding floating point numbers to zero, in accordance with a preferred embodiment of the invention.

FIG. 14 shows the circuit 1408 for rounding floating point numbers to zero. In FIG. 14, the contents of registers FRm 1410 and FRn 1414 are operated on. Both contents 1410, 1414 are floating point numbers. A normalizer 1418 normalizes the floating point numbers 1410 and 1414, as for example, may be required in an addition of these two numbers 1410 and 1414. When the floating point operation on the floating point numbers 1410 and 1414 is, for example, an addition, an adder 1422, such as a 2-m-bit CPA, adds the floating point numbers 1410 and 1414.

Of course, instead of an addition, the operation performed by the adder 1422 could be a subtraction. The output 1424 of the adder 1422 is input into a leading one detector and normalizer circuit 1425. A 2-m bit result of circuit 1425 is coupled to an intermediate register 1426. The least significant m-bits 1430 of the intermediate register 1426 are ignored. Whereas, the m most significant bits 1446 in the register 1426 are passed on to the rounded result 1450. So, as the result of the operation of circuit 1408, the m least significant bits of the result of a floating point operation on the numbers 1410 and 1414 are set to zero.

While circuit 1408 adds floating point numbers 1410 and 1414, another circuit may multiply or divide floating point numbers 1410, 1414 by each other. Based on the above description of circuit 1408, it will be clear to one of ordinary skill in the art that instead of the addition of floating point numbers as shown in circuit 1408, another circuit can divide or multiply floating point numbers 1410 and 1414. However, to achieve the rounded result 1450, the portion 1454 of circuit 1408 would not need to be changed. The portion 1454 can take any other output in place of adder output 1424 and set the least significant m-bits 1430 to zero.

A complete list of the floating point instructions and of the CPU instructions related to the floating point instructions is shown below in Tables 1 and 2. These instructions are described in detail in the Appendix A on pages A31–A57 and include C language descriptions of the instruction. These instructions, as listed in the Appendix A, show underlines that have no significance regarding the meaning of the instructions.

TABLE 1

Floating Point Instructions

| operation | op code | mnemonic |
| --- | --- | --- |
| Floating Move (Load) | FNM8 | FMOV.S @Rm, FRn |
| Floating Move (Store) | FNMA | FMOV.S FRm, @Rn |
| Floating Move Restore) | FNM9 | FMOV.S @Rm+, FRn |
| Floating Move (Save) | FNMB | FMOV.S FRmQ, @-Rn |
| Floating Move (Load with index) | FNM6 | FMOV.S @(R0. Rm), FRn |
| Floating Move (Store with index) | FNM7 | FMOV.S FRm, @(R0. Rn) |
| Floating Move (in register file) | FNMC | FMOV FRm, FRn |
| Floating Load Immediate 0 | FN8D | FLDI0 FRn |
| Floating Load Immediate 1 | FN9D | FLDI1 FRn |
| Floating Add | FNM0 | FADD FRm, FRn |
| Floating Subtract | FNM1 | FSUB FRm, FRn |
| Floating Multiply | FNM2 | FMUL FRm, FRn |
| Floating Divide | FNM3 | FDIV FRm, FRn |
| Floating Multiply Accumulate | FNME | FMAC FR0, FRm, FRn |
| Floating Compare Equal | FNM4 | FCMP/EQ FRm, FRn |
| Floating Compare Greater Than | FNM5 | FCMP/GT FRm, FRn |

| | | | |
|---|---|---|---|
| Floating Test NaN | | FN7D | FTST/NAN FRn |
| Floating Negate | | FN4D | FNEG FRn |
| Floating Absolute Value | | FN5D | FABS FRn |
| Floating Square Root | | FN6D | FSQRT FRn |
| Floating Convert from Integer | | FN2D | FLOAT FPUL, FRn |
| Floating Truncate and Convert to Integer | | FN3D | FTRC FRm, FPUL |
| Floating Store from | System Register FPUL | FN0D | FSTS FPUL, FRn |
| Floating Load to | System Register FPUL | FN1D | FLDS FRm, FPUL |

TABLE 2

CPU Instructions Related to FPU

| operation | | op code | mnemonic |
|---|---|---|---|
| Load from | System Register FPUL | 4N5A | LDS Rm, FPUL |
| Restore | System Register FPUL | 4N56 | LDS.L@Rm+, FPUL |
| Load from | System Register FPSCR | 4N6A | LDS Rm, FPSCR |
| Restore | System Register FPSCR | 4N66 | LDS.L@Rm+, FPSCR |
| Store to | System Register FPUL | 0N5A | STS FPUL, Rn |
| Save | System Register FPUL | 4N52 | STS.L FPUL, @-Rn |
| Save to | System Register FPSCR | 0N6A | STS FPSCR, Rn |
| Save | System Register FPSCR | 4N62 | STS.L FPSCR, @-Rn |

Figure 4:
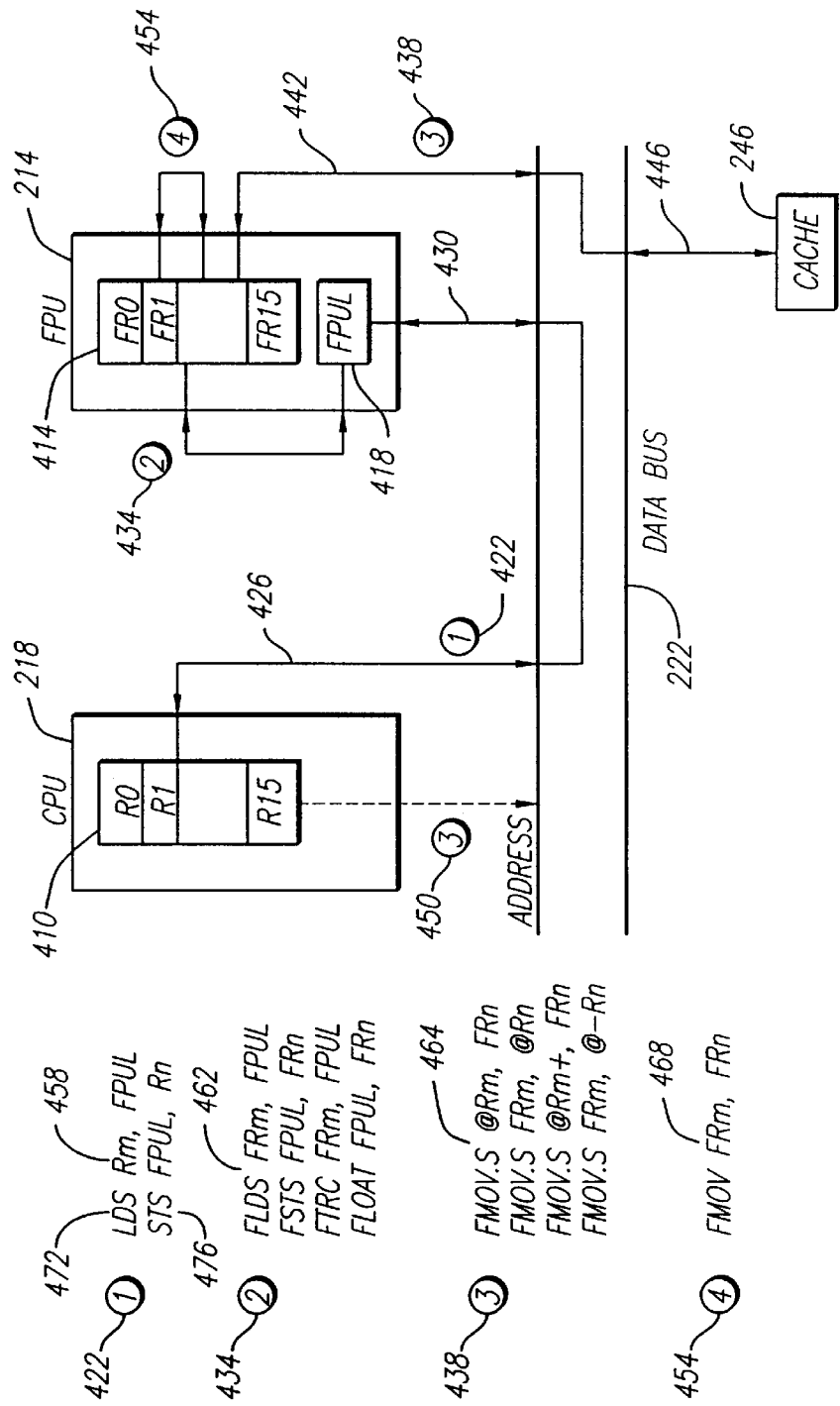
FIG. 4 is a block diagram of a circuit for moving data to and from the FPU, in accordance with a preferred embodiment of the invention.

Any exchange of data between the CPU 218 and the FPU 214 occurs via a dedicated communication register FPUL 418 (see FIG. 4). As discussed above, typically in other RISC processors data exchange between the CPU 218 and the FPU 214 occur via a transfer through memory, such as cache memory 246. Transfer via cache 246 is relatively slow compared to transfer via registers, such as the FPUL register 418.

FIG. 4 shows a block diagram of the circuit for moving data to and from the FPU 214. Such movement of data includes not only transfer of data between the CPU 218 and the FPU 214, but also includes the mechanism for the FPU 214 to indirectly access the cache memory 246 for data fetch. In FIG. 4, the CPU 218 has a register file 410, i.e., registers that range from R0 to R15. Similarly, the FPU 214 has a register file 414 with registers ranging from FR0 to FR15. In addition, the FPU 214 has the communication register FPUL 418. The CPU 218 is coupled to the FPU 214 via data path one 422. Path one 422 includes segment 426 that couples the CPU 218 to the data bus 222. Path one 422 also includes segment 430 that couples the data bus 222 to the FPUL 418. Register file 414 of the FPU 214 is coupled to the communication register FPUL 418 via data path two 434. The FPU registers 414 also are coupled via data path three 438 to cache memory 246. Path three includes path segment 442 which couples the FPU registers 414 to the data bus 222. Path three also includes segment 446 which couples the data bus 222 to the cache 246. In addition, path three has an address link 450 associated with it The address link 450 couples the CPU 218 to the data bus 222 for addressing purposes. Finally, data path four 454 couples the FPU data registers 414 to each other. Additional details about the CPU general purposes registers 410 and about the floating point registers 414 are described in the Appendix A on pages A14–A17.

There are certain CPU or FPU instruction groups that are used for data transfer along particular data paths. Data paths one, two, three, four 422, 434, 438 and 454 are associated with instruction groups 458, 462, 464, and 468, respectively.

Figure 5:
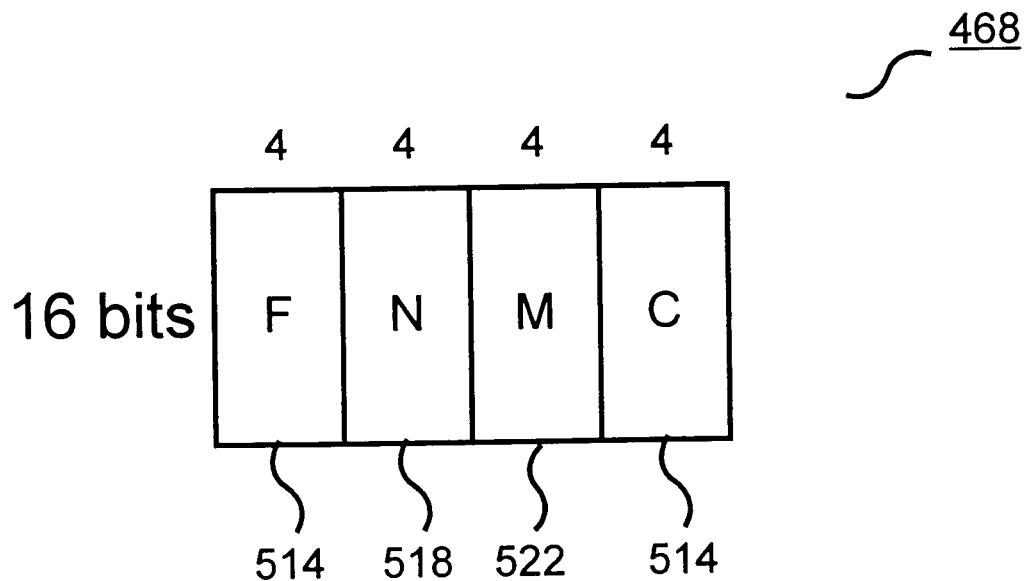
FIG. 5 illustrates a 16-bit floating point instruction, in accordance with a preferred embodiment of the invention.

FIG. 5 illustrates one of the floating point instructions of Table 1, a 16-bit floating point instruction 468, in particular the floating point instruction associated with path four 454.

The instruction 468 moves the contents of floating point register FRm to the floating point register FRn, as shown in the assembler code (mnemonic column of Table 1) and as explained on pages A56–A57 of the Appendix A, where "m" and "n" may assume values 0–15. This move instruction 468 has four parts, each with a length of four bits. Two parts of the floating point move instruction 468 make up the operation code 514. (See op code column of Table 1.) The other two parts 518 and 522, shown in hexadecimal form in FIG. 5 (and in the op code column of Table 1) denote operands, i.e., register identifiers FRn and FRm, respectively. The operation code 514 operates with the registers identified by 518 and 522 to accomplish the floating point move.

To illustrate another instruction associated with a data path and to illustrate the operation of the circuit of FIG. 4, the following explains the CPU load to communication register instruction 472 of the instruction group 458 associated with data path one 422. The instruction "LDS Rm, FPUL" CPU load to communication register instruction 472 copies the contents of the general purpose CPU register Rm to the floating point communication register FPUL 418, as explained on page A51 of the Appendix A. To execute the CPU load to communication register instruction 472, the CPU transfers the contents of register Rm to the data bus 222. In the register designation "Rm," the index "m" can range from 0–15 to identify any of the general purpose registers 410 of the CPU 218. The CPU 218 then makes available the data on the data bus 222 for a sufficient period of time, such that the data may be transferred from the data bus 430 and stored by the FPU 214 in the FPUL register 418.

Figure 6:
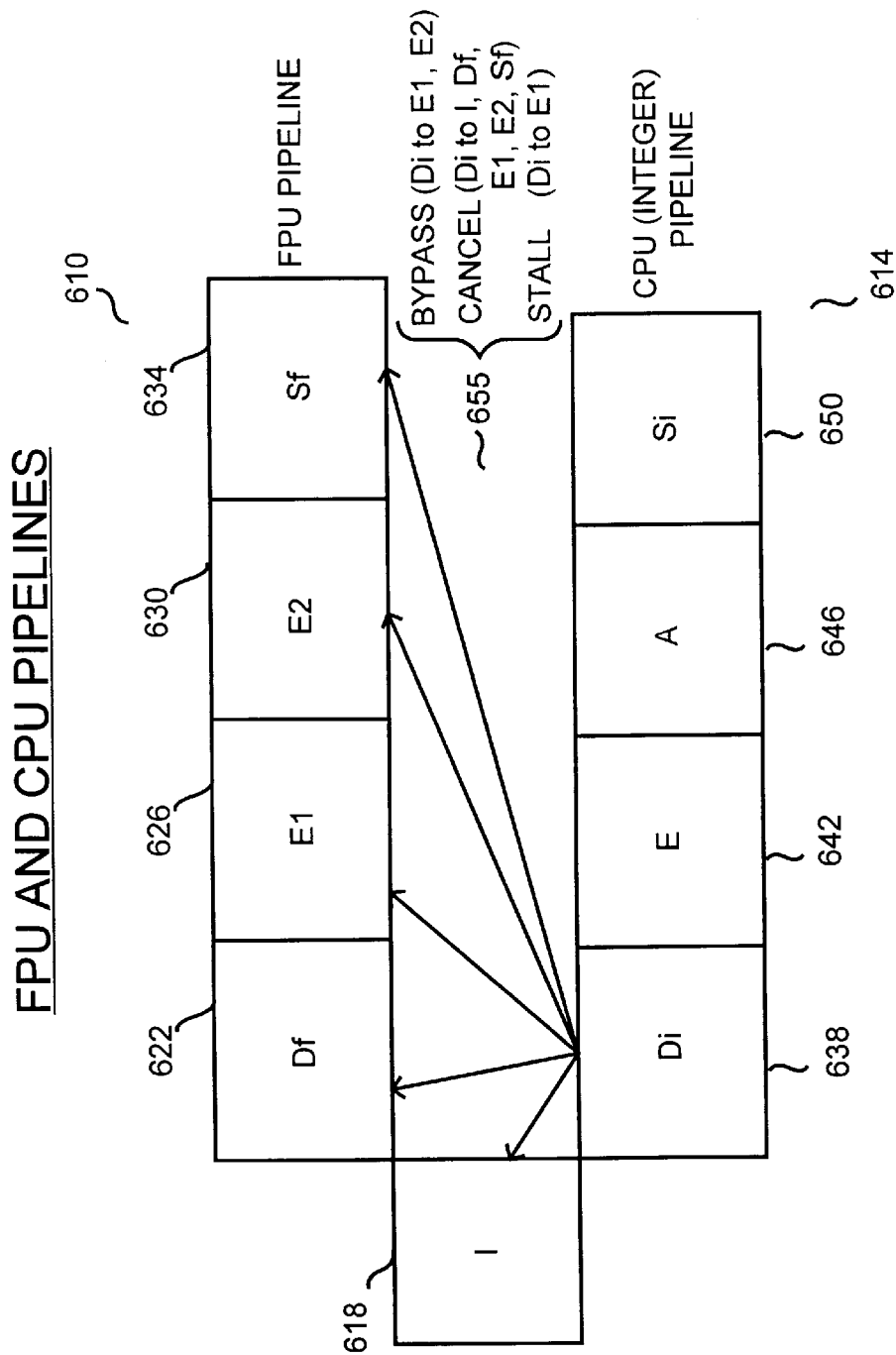
FIG. 6 illustrates pipelines of the FPU and the CPU, in accordance with a preferred embodiment of the invention.

FIG. 6 illustrates the pipelines that the FPU 214 and the CPU 218 use to execute instructions. The FPU pipeline 610 and the CPU pipeline 614 share a single instruction fetch stage 618. In addition, the FPU pipeline 610 has four more stages: a decode stage Df 622, a first execution stage E1 626, a second execution stage E2 630, and a write back stage Sf 634. Similarly, the CPU pipeline 614 has four additional stages: a decode stage Di 638, an execution stage E 642, a memory access stage A 646, and a write back stage Si 650. The Di stage 638 generates the signals for bypass, stall and cancel for the FPU pipeline stages, as shown in FIG. 6 by the arrows 655. The Di stage 638 provides, via signal paths 655, bypass signals to the E1 and E2 stages 626, 630, cancel signals to the FPU stages 622, 626, 630, 634, including the shared I stage 618, and stall related signals to the Df stage 622 and a stall signal to the E1 stage 626. These signals are fiber explained below.

An instruction available on the data bus 222 is initially retrieved by the instruction fetch stage 618. From the instruction fetch stage 618, both decode stages Df 622 and Di 638 decode the fetched instruction. The first phase of decode stage involves identifying whether an instruction is a CPU or FPU instruction. An FPU instruction is identified by an F (Hex) in the high order four bits of the instruction. If an instruction is not of floating point type, the Df stage 622 does not decode the instruction any further. Similarly, the Di stage 638 does not completely decode a floating point instruction. The Di stage 638 does not decode a floating point instruction to identify the floating point function to be performed. This results in significant reduction in hardware complexity. If only a single decode stage were used, all signals required to control an FPU data path would have to cross over from the CPU 218 to the FPU 214 causing an increase in die area. When the fetched instruction is a floating point instruction, the E1 stage 626 of the FPU pipeline 610 begins executing the instruction. The E2 stage 630 of the FPU pipeline 610, then completes the execution of this floating point instruction. Depending on the requirements of the instruction, the Sf stage 634 of the FPU pipeline 610 can store the result of the instruction in a floating point register.

Similarly, for the case when the fetched instruction is a CPU instruction, such as an instruction for operating on integers, the E 642 stage of the CPU pipeline 614 executes the instruction. The A stage 646 of the CPU pipeline 614 accesses cache memory 246, when called for by the particular instruction being executed. Finally, the Si stage 650 of the CPU pipeline 614 can write the result of the instruction into, for example, one of the CPU registers 410. Instructions that require only the use of one of the two pipelines, FPU 610 or CPU 614 pipeline, result in the instructions simply being pushed through the pipeline that is not being used. For example, when the instruction fetch stage 618 fetches an integer addition, the CPU pipeline CPU 614 executes this integer addition in the execution stage 642 and then stores the results in a register in the Si stage 650. However, having decoded the integer add instruction, the Df stage 622 of the FFU pipeline 610 pushes the integer add instruction through the E1 stage 626. The integer add instruction continues being pushed through the remaining stages of the FPU pipeline 610 during subsequent clock cycles. Similarly, when the fetched instruction is a pure floating point instruction, the Di stage 638 pushes the floating point instruction through the E stage 642 and during subsequent cycles through the remaining stages of the CPU pipeline 614.

Figure 7A:
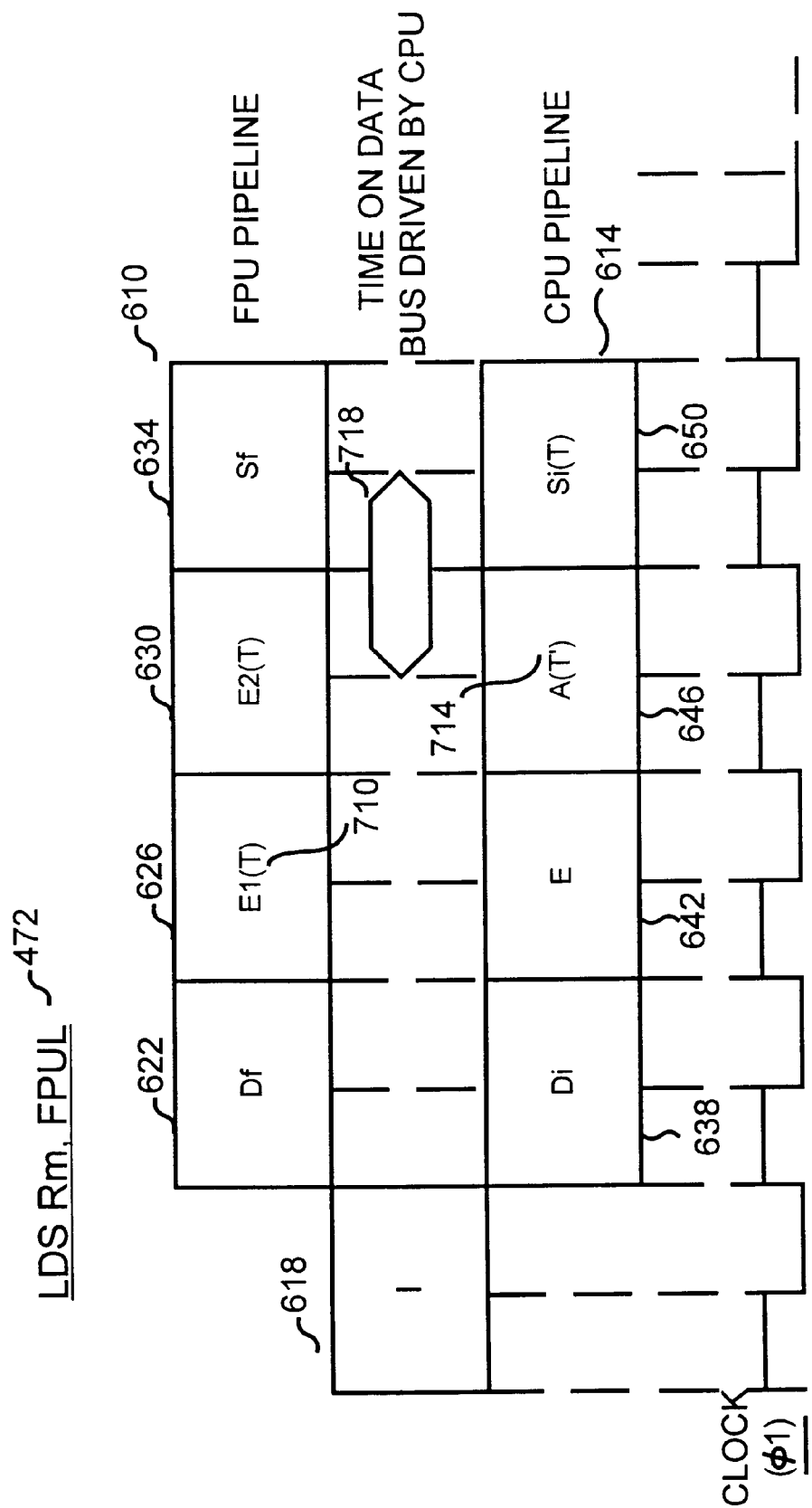
FIG. 7 (a and b) shows a diagram of the FPU pipeline and the CPU pipeline and the timing for the transfer of data between these two pipelines, in accordance with a preferred embodiment of the invention.
Figure 7B:
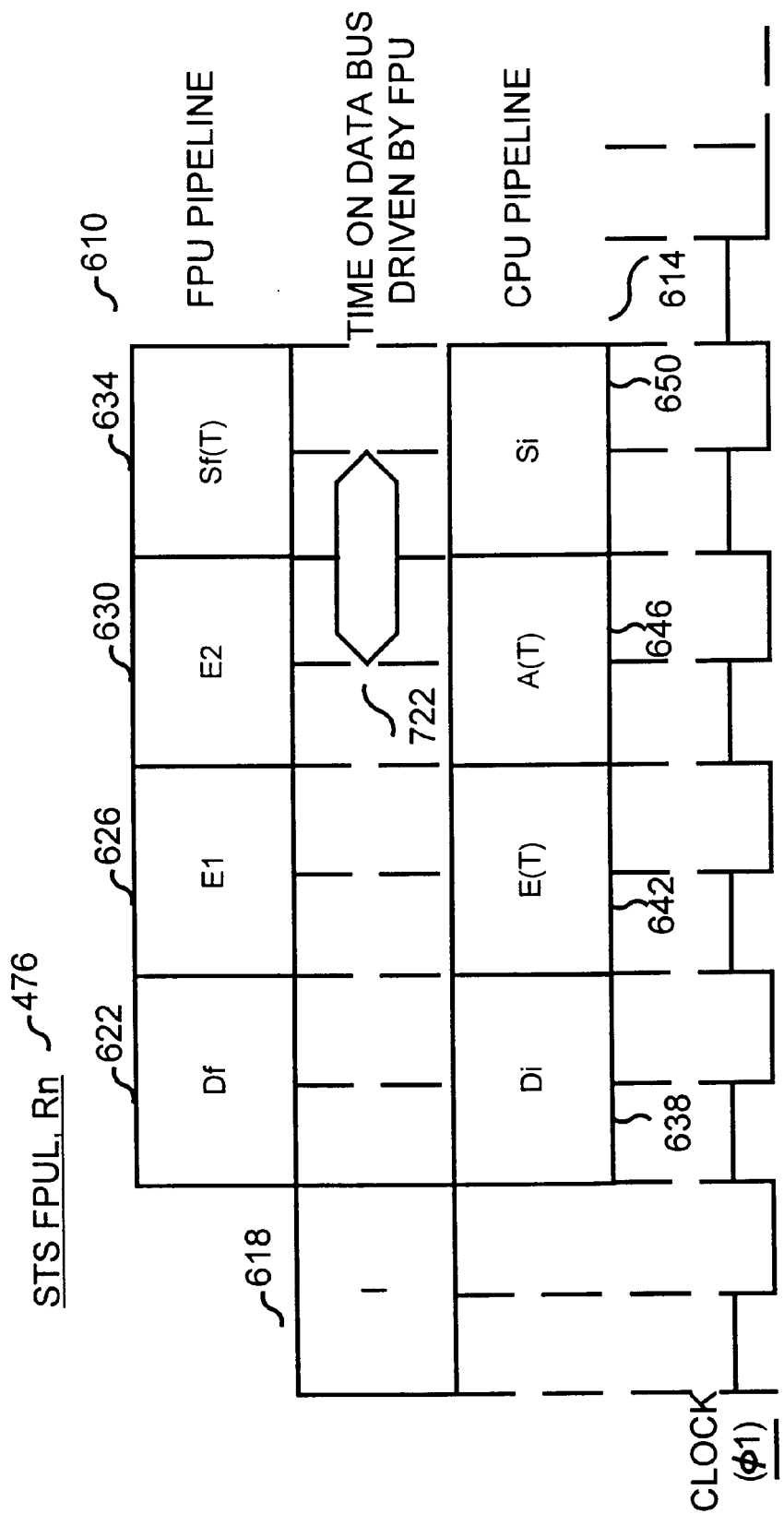

Some instructions call for data movement between the FPU pipeline 610 and the CPU pipeline 614. An example of such an instruction is the CPU load to communication register instruction 472 "LDS Rm, FPUL" using data path one 422. FIG. 7(*a*) shows the FPU pipeline 610 and the CPU pipeline 614 and the timing for the transfer of data between these two pipelines 610, 614. The pipeline structure is as explained in FIG. 6. Note that each stage of the pipeline also corresponds to a single clock cycle of, for instance, a phase one clock 708, (for clarity, a phase two clock is not shown). The CPU load to communication register instruction 472 is a CPU 218 instruction. But as explained above, all instructions are decoded by both decode stages 622, 638 of the FPU and CPU pipelines 610, 614. So, upon decoding the CPU load to communication register instruction 472, the Df stage 622 determines that the FPU pipeline 610 will be involved, since the FPU 214 controls access to the FPUL register 418. Initially, the CPU load to communication register instruction 472 is executed by the CPU pipeline 614 in the E stage 642. At the same time, the E1 stage 626 of the FPU pipeline 610 passes the instruction through without any action, as designated by the letter "T" 710. In other words, the CPU load to communication register instruction 472 simply is pushed through the E1 stage 710.

Generally, each stage of the pipelines 610, 614 takes one cycle to execute. But there are special situations when an instruction spends more than one cycle in a pipeline stage. In that case, an instruction is recirculated through that particular pipeline stage. For example, the floating point divide instruction "FDIV", as shown on page A39 of the Appendix A, has a latency of thirteen cycles. Here, latency is a measure of the total number of cycles that an instruction spends in the execution stages 626, 630 of, for instance, the FPU pipeline 610. A floating point instruction spends one cycle in the E2 stage 630, from which it is apparent that the floating point divide instruction spends twelve cycles in the E1 stage 626. Also shown on page A39 of the Appendix A is the pitch of the floating point divide instruction, which is the measure of the clock cycles before an instruction following the current instruction can start execution in a pipeline. For example, the next instruction following the floating point divide instruction can begin execution after twelve cycles, since the pitch of the floating point divide instruction equals twelve cycles. A pitch of value twelve indicates that the floating point divide instruction spends twelve cycles in the E1 stage 626. Consequently, the next floating point instruction has to wait twelve clock cycles before entering the E1 stage 626.

Returning to the example of the load to communication register instruction 472, since the same instruction flows in both the FPU and the CPU pipelines 610, 614, the resources of the E1 stage 626 will be held for the same amount of cycles that the E stage 642 of the CPU pipeline 614 executes. Next, the A stage 646 of the CPU pipeline 614 sources the contents of the register, referenced "Rm" in the LDS CPU load to communication register instruction 472, onto the data bus 222. Since this is not an instruction that requires cache memory access, the A stage 646 only loads the data bus from the CPU register file 410. A T' 714 indicates that no memory access takes place.

While the CPU pipeline is placing the contents of register "Rm" on the data bus 222, the E2 stage 630 of the FPU pipeline 610 is pushing the instruction through without any action, as indicated by the letter "T". The CPU stage A 646 makes the contents of the register Rm available on the data bus 222 for a limited period of time, data-ready time 718. "Data-ready time is the time that the data bus is busy with the data transfer related to the CPU load to communication register instruction 472. During the period 718 that the data is available on the data bus 222, the write back stage Sf 634 of the FPU pipeline 610 retrieves the data on the data bus 222 and stores it in the register FPUL.

The CPU store instruction "STS FPUL, Rn" 476 is executed similarly by the two pipelines 610 and 614, as shown in FIG. 7(*b*). The CPU store instruction 476 copies the contents of FPUL register into a CPU general purpose register Rn. However, in the case of the CPU store instruction 476, the FPU 214 controls the period 722 of time that the contents of the FPUL register is available on the data bus 222.

FIG. 8 is a more detailed circuit diagram 806 of the FPU pipeline 610. Shown in the circuit of FIG. 8 are latches 814, 818, 822, and 826 included in the FPU pipeline stages 622, 626, 630, and 634, respectively. The FPU pipeline stages 622, 626, 630, and 634 store their outputs in their respective latches 814, 818, 822, and 826 at either a down edge of a first phase 808, 708 of the clock or at a down edge of a second phase 810 of the clock. Also shown are bypass signals 828 as further discussed below. The function of the FPU pipeline circuit 806 is illustrated by examples discussed immediately and also further below. In the example of the CPU load to communication register instruction 472, the FPU decode stage Df 622 controls the retrieval of the contents of register Rm from the data bus 222 by asserting a select signal on the select signal path 830 of a multiplexer 834, such that the data is loaded into the FPUL register 418.

Figure 9:
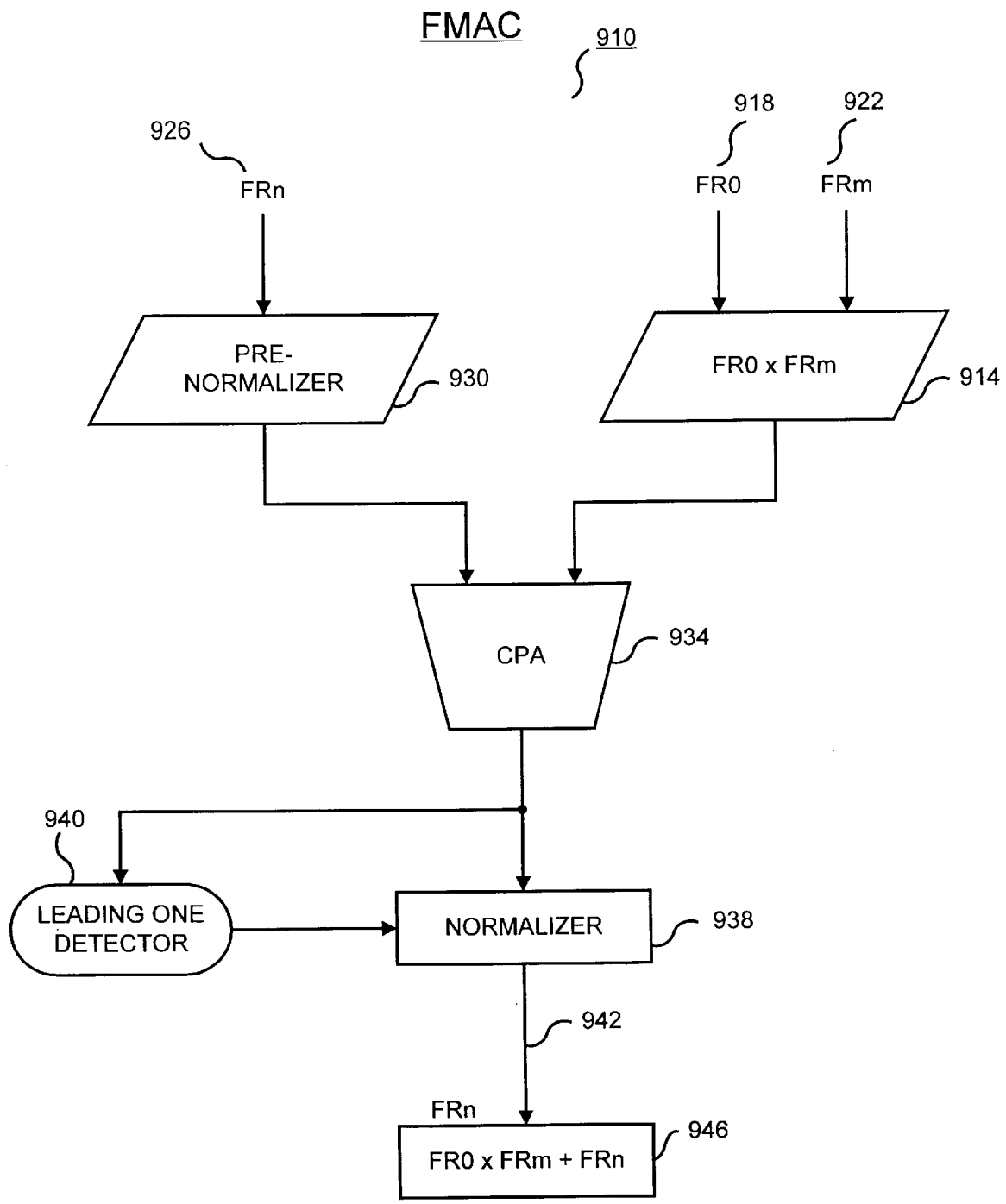
FIG. 9 is a diagram illustrating a basic FMAC circuit that executes an FMAC instruction, in accordance with a preferred embodiment of the invention.

Besides the floating point instruction groups 458, 462, 464, and 468 shown in FIG. 4, page A30 of the Appendix A lists, as mentioned above, additional instructions. In particular, Table 3 of the Appendix A on page A30 lists a floating point multiply and accumulate, FMAC, instruction "FMAC FR0, FRm, FRn. " FIG. 9 is a basic FMAC circuit 910 that executes the FMAC instruction. The FMAC circuit may be that described in commonly owned U.S. Patent Application entitled "Fast Method of Floating-Point Multiplication and Accumulation," application Ser. No. 08/544, 159, which is hereby incorporated by reference. In FIG. 9, floating point multiplier 914 multiplies the contents of floating point register FR0 918 by the contents of the floating point register FRm 922. The contents of the floating point register FRn 926 are coupled to a pre-normalizer 930. The letters "m" and "n" designate any of the floating point registers 414 in FIG. 4. Both the pre-normalizer 930 as well as the multiplier 914 are coupled to an adder, such as a carry propagation adder 934. The output of the adder 934 is coupled to a normalizer 938, which is coupled to a leading one detector 940. The output 942 of the normalizer 938 is coupled to the floating point register FRn 946.

Preferably, the FMAC 910 functions by accumulating the output 942 of the FMAC 910 into the floating point register FRn 946. For example, several consecutive FMAC instructions may be executed. The need for executing multiple consecutive FMAC instructions arises in three-dimensional graphics and video game applications. Each FMAC instruction then can accumulate the result of the FMAC operation into a different floating point register 946. This avoids pipeline stalls between consecutively executed FMAC instructions. A stall in one pipeline stage does not stop the actions in other stages of the pipeline. Instead a NOP (no operation) instruction is inserted into the stage having a stall. Then the NOP is allowed to flow through the pipeline. A dependency stall can happen when consecutive FMAC instructions accumulate into the same floating point register. However, in this embodiment, consecutive FMAC operations can accumulate into different floating point registers. This permits avoiding dependency stalls between consecutive FMAC instructions.

Other instructions listed in Table 1 are the floating point load immediate "0" and "1" instructions. Typically, RISC microprocessors do not have such floating point instructions. Instead of having these instructions, other RISC floating point instruction sets require a sequence of instructions to load a floating point value of "0" or "1" into a floating point register. Other RISC microprocessors dedicate floating point registers (e.g., seven out of thirty-two registers) to hold the constants "0" and "1". In an instruction set, such as this embodiment, dedicating registers would severely limit the availability of floating point registers for scheduling by the compiler. The circuit diagram for executing the load immediate floating point "0" or load immediate floating point "1" instruction is shown in FIG. 10.

Figure 10:
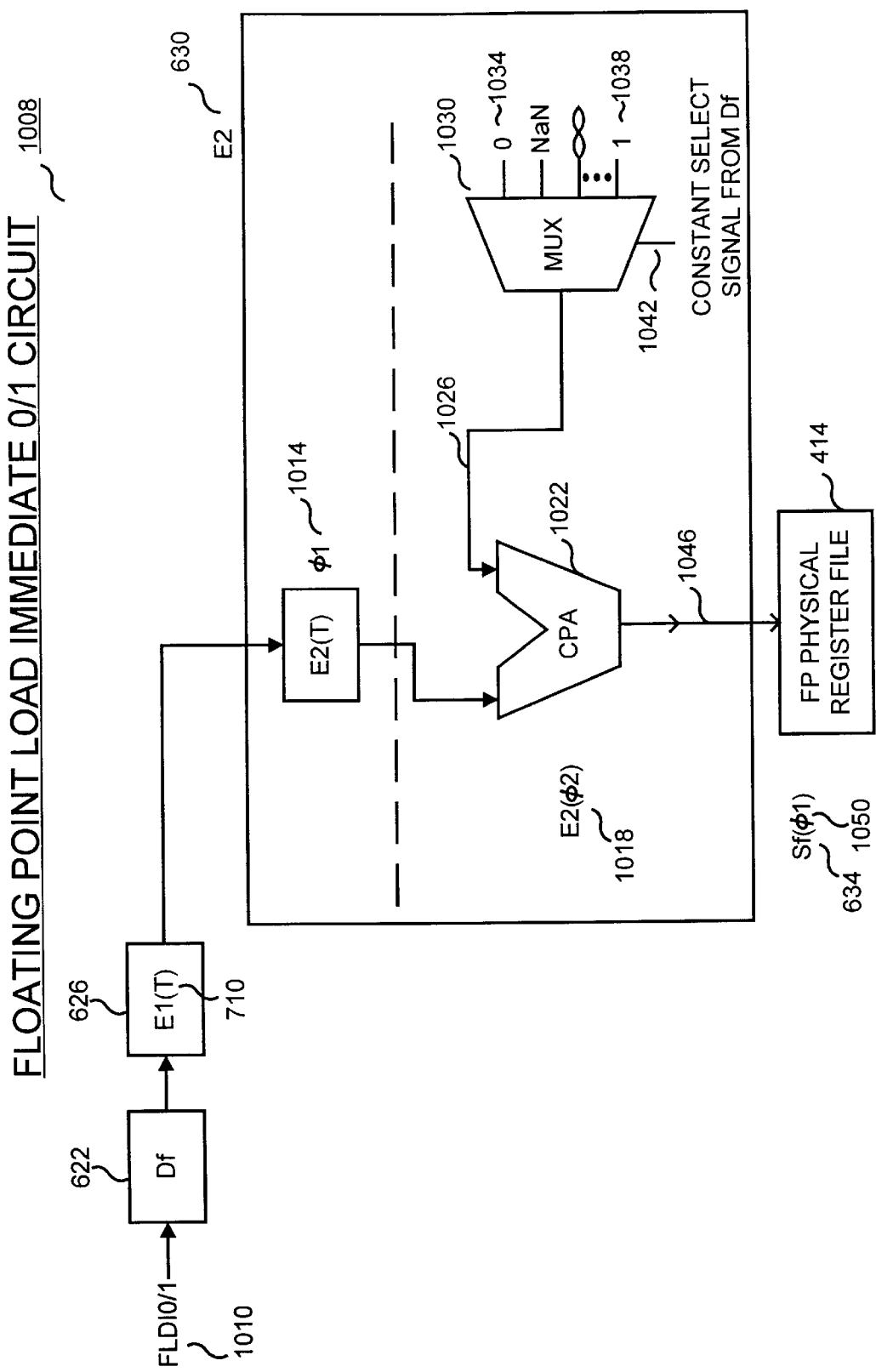
FIG. 10 is a diagram illustrating a circuit for executing the load immediate floating point "0" or load immediate floating point "1" instruction, in accordance with a preferred embodiment of the invention.

FIG. 10 shows a circuit diagram 1008 for an immediate load of a floating point zero or a one. Circuit 1008 receives from the fetch stage I 618 (see FIG. 6) the floating point load immediate zero or one instruction 1010. Having decoded the instruction, the decode stage Df 622 of the FPU pipeline 610 lets the load immediate instruction 1010 move to the next stage E1 626. Next, the E1 stage 626 lets the load immediate instruction 1010 pass through, as indicated by the letter "T" 710. Similarly, the phase one part 1014 of the E2 stage 630 lets the load immediate instruction 1010 pass through. The phase two part 1018 of the E2 stage 630 includes an adder, such as a Carry Propagation Adder (CPA) 1022 that is coupled to the phase one part 1014 of the E2 stage and that is also coupled to the output 1026 of a multiplexer 1030. The multiplexer 1030 has several inputs. One of the multiplexer inputs is a zero signal 1034. Another input is a one signal 1038. The decode stage Df 622 can apply a constant select signal at selector 1042 of the multiplexer 1030. Whether the Df stage 622 selects the zero signal 1034 or the one signal 1038 depends on which of the two load immediate instructions 1010 the Df stage 622 receives from the fetch stage 618. An output 1046 of the adder 1022 is coupled to the floating point register file 414, which is a part of the phase one part 1050 of the Sf stage 634.

Figure 11:
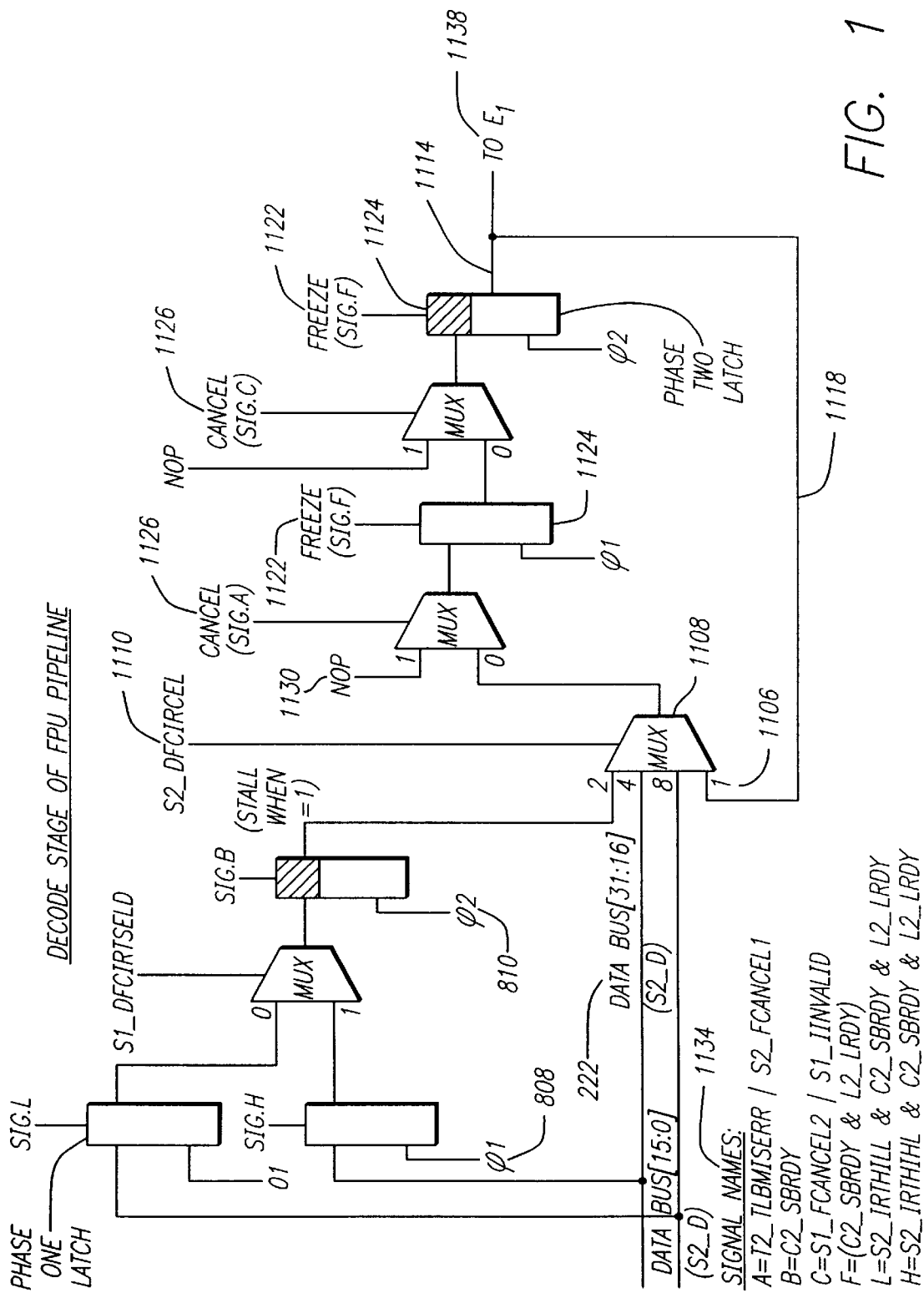
FIG. 11 is a diagram illustrating a decode stage of the FPU pipeline, in accordance with a preferred embodiment of the invention.

FIG. 11 is a circuit diagram of the decode stage Df 622 of the FPU pipeline 622. The function of the decode stage Df 622 depends on stall signal 1210 (see FIG. 12), which is generated by the decode stage Di 638 of the CPU 218. This stall signal 1210 is used in the execution stage E1 626 of the FPU pipeline 610 to introduce a NOP 1214 in the E1 stage 626. When the Df stage 622 detects a stall condition (see FIG. 24 of patent application Ser. No. 08/594,763), the Df stage 622 of FIG. 11 recirculates an instruction being decoded in Df 622 from a Df output 1114. Recirculation via recirculation path 1118 is achieved by a control signal 1110 from Di 638 selecting input 1106 (selector=1) of a multiplexer 1108.

FIG. 11 also shows the freeze signal selector paths 1122. As explained above, a freeze signal causes a pipeline to stop all execution in the entire pipeline. Similarly to the stall signal, a freeze signal is applied to both pipelines 610, 614, as explained above. The freeze signal 1122 disables the latches 1124. Also shown in FIG. 11 is a cancel signal selector path 1126. Applying a cancel signal at the cancel selector path 1126 cancels any instruction at that point in the pipeline by inserting a NOP 1130. Table 1134 further describes the signals applied to the decode stage 622 of the FPU pipeline 610. The explanation of symbolic signals (e.g. sig.A, sig.B, etc.) is in C-language notation. In Table 1134, the vertical lines in the signal name definitions represent logical "OR". The "&'s" represent logical AND's. The "~" represents a logical inversion. These signal names are listed with explanations in the Appendix A on pages A58 through A59.

Figure 12:
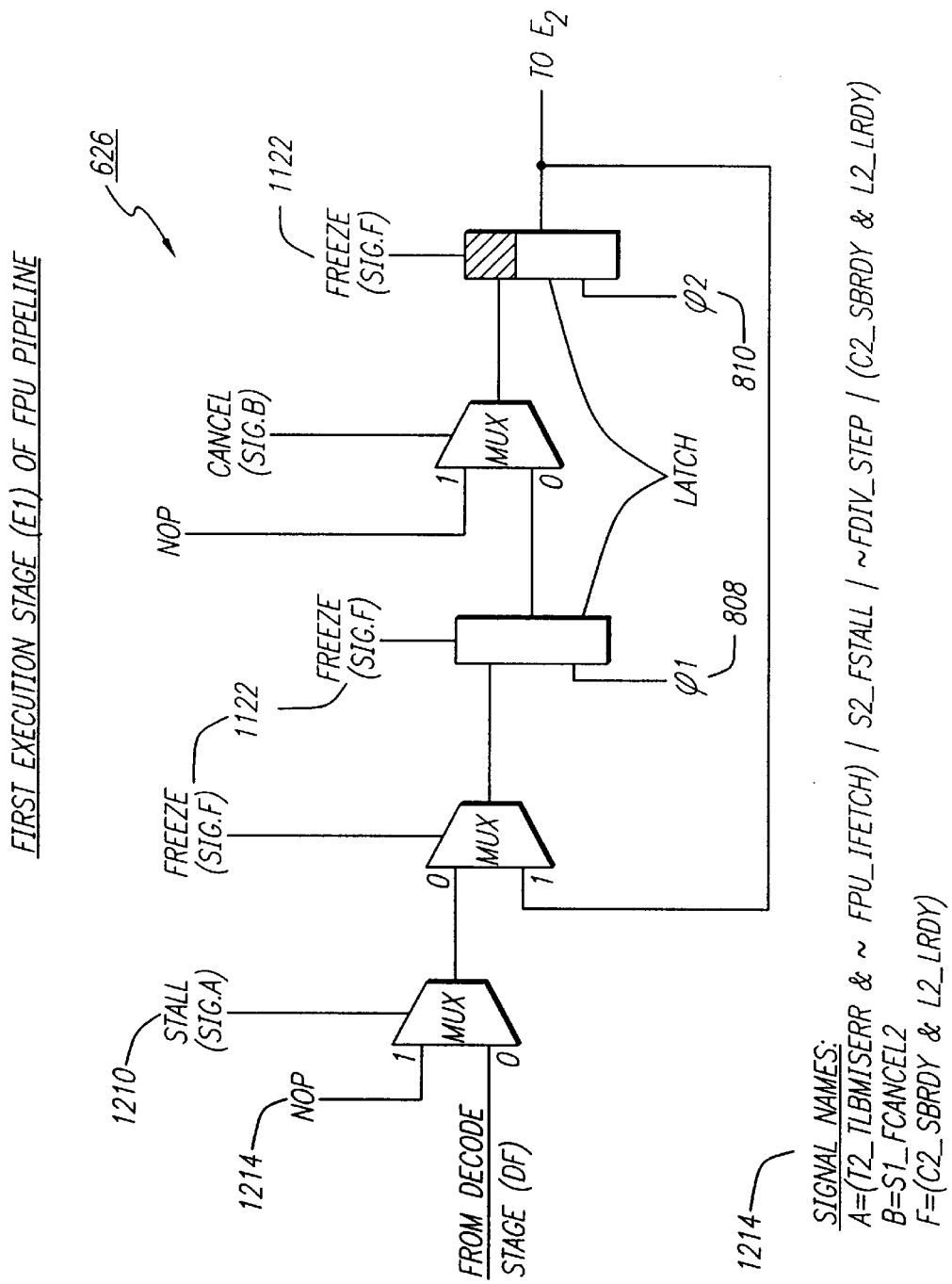
FIG. 12 is a diagram illustrating a first execution stage E1 of the FPU pipeline, in accordance with a preferred embodiment of the invention.

FIG. 12 shows a diagram of the first execution stage E1 626 of the FPU pipeline 610. When a stall is appropriate in the first execution stage 626, the decode stage 638 of the CPU 638 applies a stall signal at the stall signal path 1210, as described above. This prevents the output 1138 of the FPU decode stage 622 from being inserted into the E1 stage 626. Instead, assertion of the stall signal at path 1210 causes a NOP to be inserted into the E1 stage 626. The application of the freeze and cancel signals in FIG. 12 is similar to that of FIG. 11. The signals are explained in further detail in Table 1214.

Figure 13:
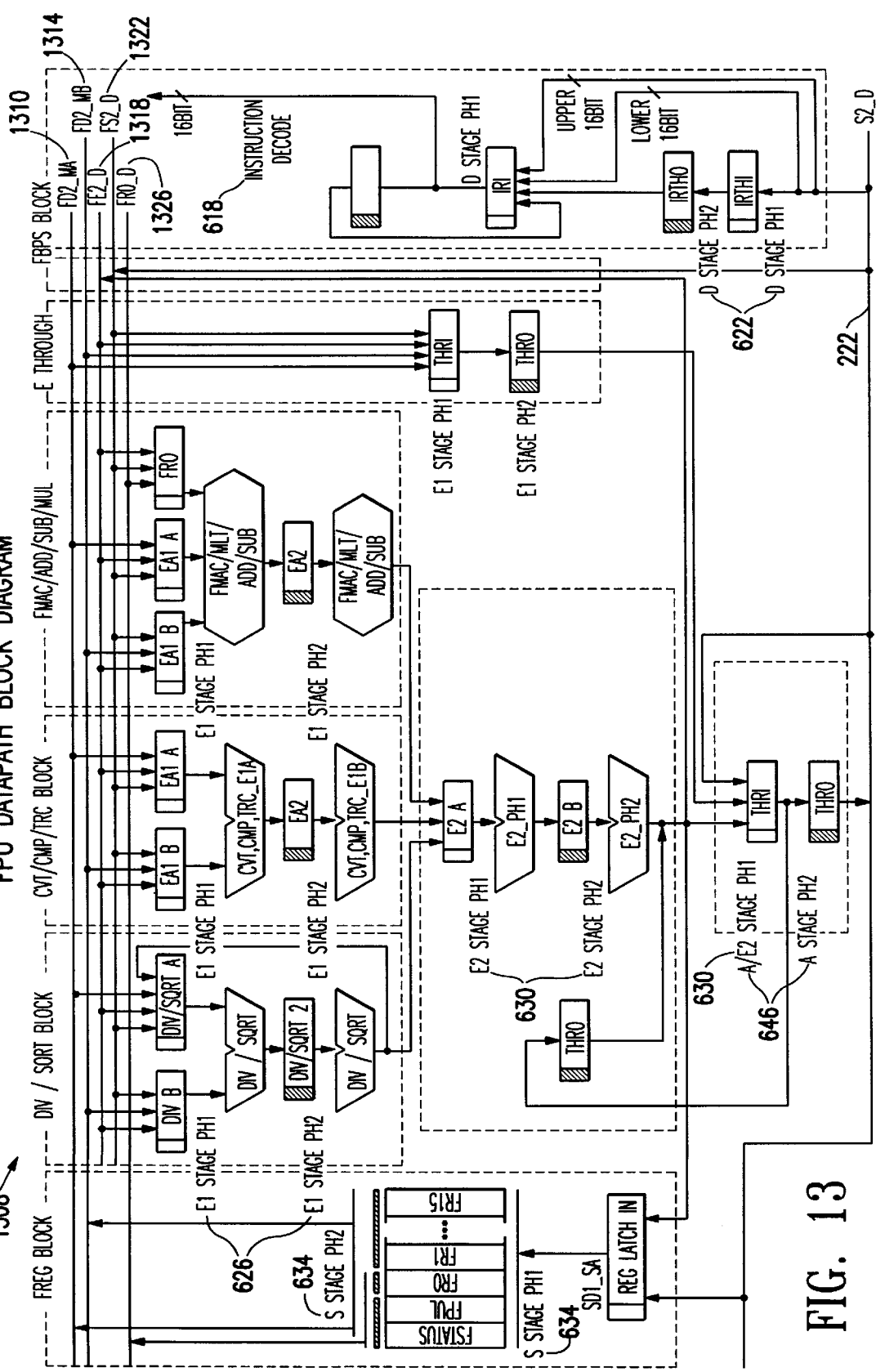
FIG. 13 is a detailed circuit diagram of the FPU pipeline, in accordance with a preferred embodiment of the invention.

FIG. 13 is a detailed circuit diagram of stages Df 622, E1 626, E2 630, and Sf 634 of the FPU pipeline 610. The FPU pipeline circuit 1308 shows several inputs. Input 1310 is for a first operand and input 1314 is for a second operand of an FPU or CPU instruction. Input 1318 accepts bypass data for recirculating the output of the E2 stage 630 back to an input of the E1 stage. Input 1322 is for bypassing the contents of data bus (S2-D) 222 back to the input of the E1 stage. Input 1326 is an input from the FR0 register of the register file 414. Based on the above description and the descriptive names in FIG. 13, one of ordinary skill in the art will understand the remaining portions of circuit 1308.

Several preferred embodiments of the present invention have been described. Nevertheless it will be understood that various modifications may be made without departing from the spirit and scope of the invention. Thus, the present invention is not limited to the preferred embodiments described herein, but may be altered in a variety of ways, which will be apparent to a person skilled in the art.

What is claimed is:

1. An apparatus for use in a reduced instruction set computer having a memory, the apparatus comprising:

a processor operable with a 32-bit processor instruction set stored in the memory; and a floating point unit operable with a 16-bit fixed length floating point instruction set stored in the memory.

2. The apparatus of claim 1, further comprising a floating point register file having a plurality of floating point registers, wherein the 16-bit fixed length floating point instruction set comprises a floating point multiplication and accumulation instruction for accumulating into any one of the plurality of floating point registers of the floating point register file, for executing consecutive floating point multiplication and accumulation instructions without dependency stalls.

3. The apparatus of claim 2, wherein the floating point register file has a first and second floating point registers, and wherein the floating point multiplication and accumulation instruction accumulates consecutively into the first and second floating point registers.

4. The apparatus of claim 2, wherein the floating point unit includes an FMAC for executing the floating point multiplication and accumulation instruction.

5. The apparatus of claim 1, further comprising a first floating point register, wherein the 16-bit fixed length floating point instruction set comprises a load immediate instruction for loading a floating point zero into the first register.

6. The apparatus of claim 5, further comprising a second floating point register, wherein the load immediate instruction is for loading a floating point zero into the second register.

7. The apparatus of claim 1, further comprising a first floating point register, wherein the 16-bit fixed length floating point instruction set comprises a load immediate instruction for loading a floating point one into the first register.

8. The apparatus of claim 7, further comprising a second floating point register, wherein the load immediate instruction is for loading a floating point one into the first register and the second register.

9. The apparatus of claim 1, wherein the floating point unit comprises:

a floating point operation circuit;

a leading one detector and normalizer circuit coupled to the floating point operation circuit, the leading one detector and normalizer circuit having an output for coupling data comprising a higher part and a lower part; and a register coupled to the output of the leading one detector and normalizer circuit, the register having an output for coupling the higher part of the leading one detector and normalizer circuit.

10. The apparatus of claim 9, wherein the floating point operation circuit includes a normalizer and an adder coupled to the normalizer.

11. The apparatus of claim 9, wherein the output of the register ignores the lower part of the data, whereby the data is rounded to zero.

12. The apparatus of claim 1, wherein the floating point unit comprises a floating point load immediate circuit for executing a floating point load immediate instruction.

13. A floating point unit for coupling to a 32-bit reduced instruction set processor, the floating point unit comprising:

a dedicated communication register configured for coupling to the processor for exchanging data between the floating point unit and the processor, wherein the floating point unit is operable with a 16-bit fixed length floating point instruction set stored in the memory.

14. A reduced instruction set computer having a memory, the reduced instruction set computer comprising:

a floating point unit comprising a dedicated communication register, wherein the floating point unit is operable with a 16-bit fixed length floating point instruction set stored in the memory;

a 32-bit processor, coupled to the communication register of the floating point unit, for exchanging data between the floating point unit and the processor.

15. The reduced instruction set computer of claim 14, wherein the processor fetches instructions for the floating point unit.

16. The reduced instruction set computer of claim 14, wherein the processor initiates data fetches from memory for the floating point unit.

17. A floating point unit for coupling to a 32-bit reduced instruction set processor, the floating point unit comprising:

a floating point operation circuit having an input for coupling to a floating point number and an output, wherein the floating point operation circuit is operable with a 16-bit fixed length floating point instruction set stored in the memory;

a denormalized number detector coupled to the floating point operation circuit for detecting a denormalized characteristic of the floating point number;

a selector coupled to the input and output of the floating point operation circuit, the selector having an output; and a selector signal circuit coupled to the denormalized number detector and to the selector for selecting for the output of the selector a zero floating point number, when a denormalized floating point number is coupled to the input of the floating point operation circuit, and otherwise for selecting the output of the floating point operation circuit for the output of the selector.

18. The floating point unit of claim 17, further comprising a communication register for coupling to the processor to exchange data between the floating point unit and the processor.

19. A process for performing 16-bit floating point instructions on a 32-bit reduced instruction set processor, comprising the steps of:

fetching, by the 32-bit processor, a 32-bit processor instruction for the processing unit;

executing, by the 32-bit processor, the 32-bit processor instruction for the processing unit;

fetching, by the 32-bit processor, a 16-bit floating point instruction for the floating point unit; and executing, by the 16-bit floating point unit, the 16-bit floating point instruction fetched by the 32-bit processor.

20. An apparatus for performing 16-bit floating point instructions on a 32-bit reduced instruction set processor, comprising:

means for fetching, by the 32-bit processor, a 32-bit processor instruction for the processing unit;

means for executing, by the 32-bit processor, the 32-bit processor instruction for the processing unit;

means for fetching, by the 32-bit processor, a 16-bit floating point instruction for the floating point unit; and means for executing, by the 16-bit floating point unit, the 16-bit floating point instruction fetched by the 32-bit processor.

* * * * *